United States Patent
Traylor

[15] 3,643,692
[45] Feb. 22, 1972

[54] VALVE
[72] Inventor: Paul L. Traylor, 2506 Lighthouse Lane, Corona Del Mar, Calif. 92625
[22] Filed: Sept. 28, 1970
[21] Appl. No.: 76,076

[52] U.S. Cl. ................................. 137/599.1, 137/625.29
[51] Int. Cl. .......................................................... F16k 43/00
[58] Field of Search .................................. 137/599.1, 625.29

[56] References Cited

UNITED STATES PATENTS

| | | | |
|---|---|---|---|
| 2,542,391 | 2/1951 | Brown | 137/625.29 |
| 2,564,066 | 8/1951 | Jordan | 137/625.29 |
| 3,460,566 | 8/1969 | Heartstedt | 137/599.1 X |

Primary Examiner—Robert G. Nilson
Attorney—Fulwider, Patton, Rieber, Lee & Utecht

[57] ABSTRACT

A valve for controlling fluid flow and particularly useful as a bypass valve for water treatment equipment. The valve is characterized by a casing provided with parallel main and auxiliary bores intersected by a plurality of passages and reciprocably accommodating a valve member for movement in the main bore between bypass and water treatment positions. The axes of the bores and passages lie in the same plane to facilitate water flow and simplify installation, and the auxiliary and main bores are preferably cylindrical and of approximately the same diameter so that the valve is thereby capable of flexibility in mounting auxiliary elements such as strainers, shutoff valve members and the like.

10 Claims, 7 Drawing Figures

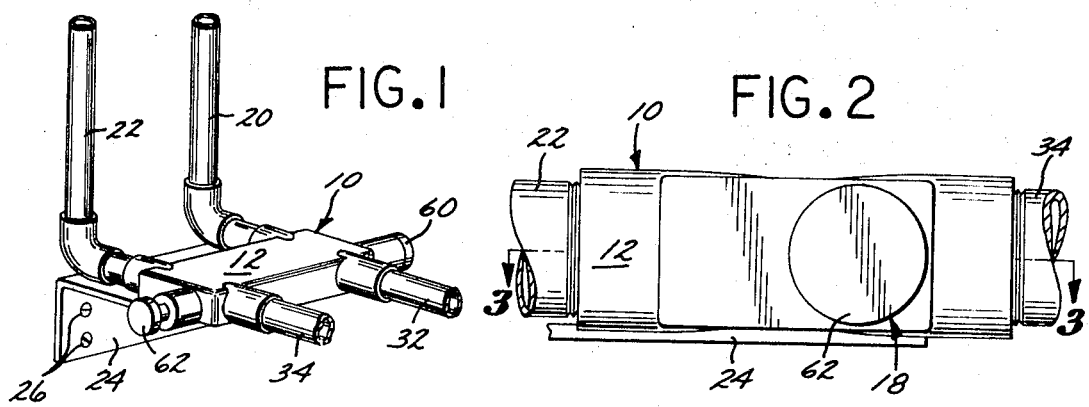
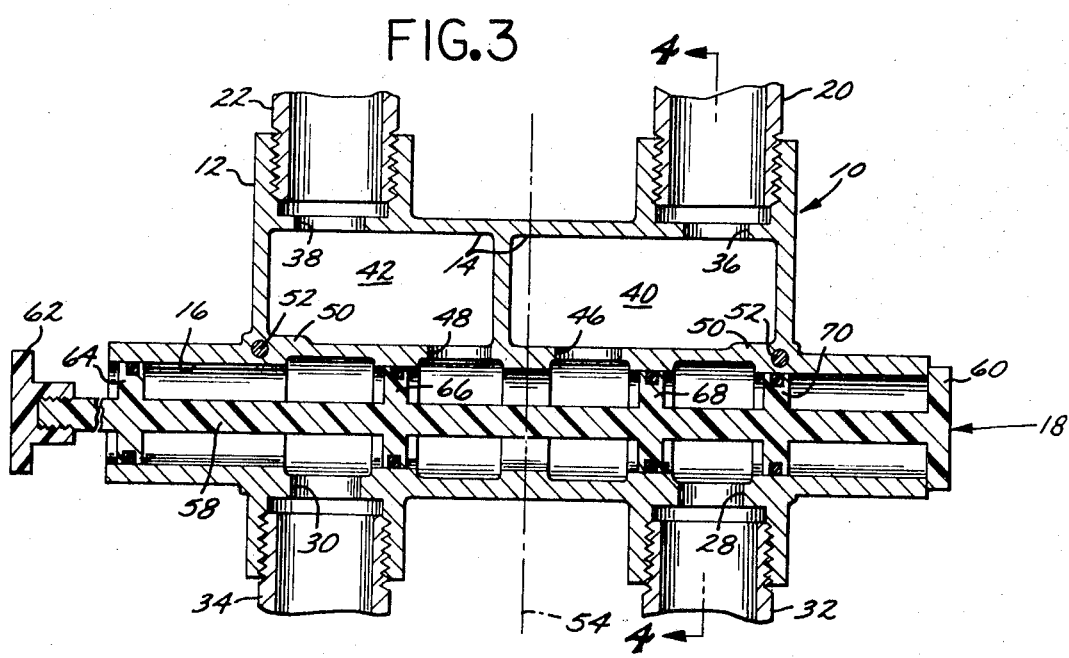
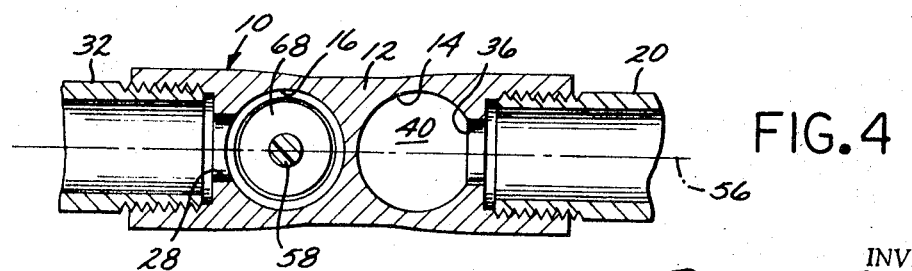
INVENTOR.
PAUL L. TRAYLOR

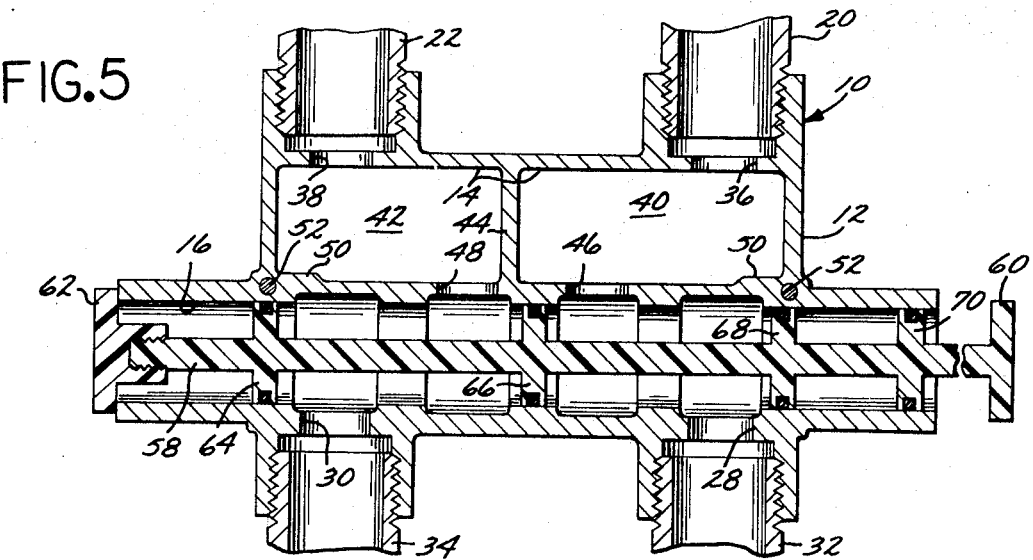
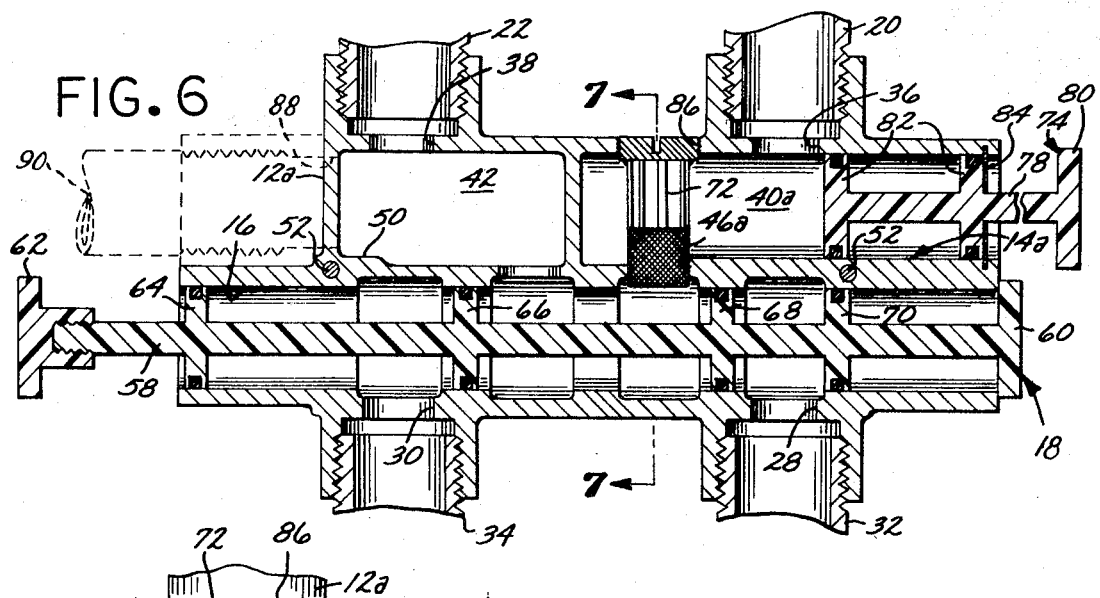
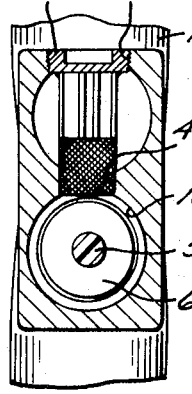
INVENTOR.
PAUL L. TRAYLOR

3,643,692

VALVE

BACKGROUND OF THE INVENTION

1. Field of the Invention

The present invention relates to valves for controlling fluid flow.

2. Description of the Prior Art

A constant supply of water is desirable in many situations and any water treatment equipment associated with the supply water must therefore be bypassed whenever the equipment is out of service. This is a rather frequent occurrence in the case of a water softener of the type not utilizing a brine tank and which therefore must be replaced at regular intervals with a freshly recharged or regenerated tank. During such replacement the water has to be isolated from the softener. In so-called "automatic" water softeners the water-softening tank is not replaced, but there are other occasions when such a softener must be bypassed, such as when the equipment is being repaired, or when the user is away for an extended period of time and wishes to shut down the softener. A bypass valve located upstream of the softener is normally used to accomplish this.

Many of the bypass valves of the prior art have a configuration which does not lend itself to easy installation without special mounting brackets or special tools. The valve bodies frequently include offset portions which do not fit flat against existing wall structure, and often there is a disparity in spacing between the inlet ports as compared to the outlet ports to the valve. This complicates the plumbing and slows the installation of the associated softener. Moreover, water softener bypass valves of the prior art are not sufficiently versatile, in that they are not capable of accommodating desirable auxiliary equipment, such as water purifier strainers, or additional shutoff valves and the like without substantial reworking of the complete valve.

SUMMARY

According to the present invention, a fluid handling valve, and particularly a bypass valve for water treatment equipment, is provided which is characterized by a casing having parallel main and auxiliary bores intersected by passages for the receipt of water, for passage of the water to the treatment equipment, and for discharge of the treated water to a household or the like. The axes of the main and auxiliary bores all lie in the same plane to facilitate and the various passages all lie in the same plane to facilitate water flow and to simplify installation of the valve flat against a wall or other supporting surface, in either a vertical or a horizontal position. Moreover, the axes of these various passages are generally symmetrical about a centerline passing through the middle of the valve body so that the mounting or connection of conduits to the valve is simplified. That is, the conduits passing into and out of the valve are generally axially aligned and equidistant so that the conduits are easy to lay out and provide an improved appearance in the overall installation.

The main and auxiliary bores are preferably of approximately the same diameter so that the valve is adapted to accommodate additional equipment in the auxiliary bore. Thus, there can be incorporated, either alone or in combination, a water strainer to remove impurities from incoming water, and a shutoff valve to provide additional means for isolating the softener from the supply and house lines.

The reference to the valve use with water treatment equipment is merely exemplary, the valve being useful in a variety of other applications requiring fluid flow control.

Other objects and features of the invention will become apparent from consideration of the following description taken in connection with the accompanying drawings.

BRIEF DESCRIPTION OF THE DRAWINGS

FIG. 1 is a perspective view of a bypass valve, according to the present invention, mounted upon a suitable bracket for affixation to a wall or the like;

FIG. 2 is a left side elevational view of the valve;

FIG. 3 is an enlarged view taken along the line 3—3 of FIG. 2, and illustrating the valve member in its bypass position;

FIG. 4 is a view taken along the line 4—4 of FIG. 3, but rotated clockwise 90° to better fit the available drawing space;

FIG. 5 is a view similar to FIG. 3, but showing the valve member in its water treatment position;

FIG. 6 is a longitudinal cross-sectional view of a modified form of valve; and

FIG. 7 is a view taken along the line 7—7 of FIG. 6.

DESCRIPTION OF THE PREFERRED EMBODIMENTS

Referring now to FIGS. 1–5, there is illustrated a bypass valve 10 comprising, generally, an elongated valve body or casing 12 having a longitudinally extending auxiliary bore 14 and a parallel, longitudinally extending main bore 16. The valve 10 also comprises a push rod or valve member 18 mounted for reciprocation in the main bore 16 between a bypass position, as illustrated in FIG. 3, and a water treatment position, as illustrated in FIG. 5. In the bypass position water passes from a water main or supply conduit 20, through the valve 10, and into a distribution conduit 22 which extends to the house or other area of use. None of the water passes to the water treatment equipment (not shown).

In the water treatment position of FIG. 5, as will be more particularly described hereinafter, the water passes from the supply conduit 20, through the valve 10, into and out of the water treatment equipment (not shown), and thence back through the valve 10 and into the distribution conduit 22.

The valve casing 12 is preferably made of cast brass or similar metal, although it could also be made of molded plastic or any other suitable material capable of withstanding usual water main pressures. The casing 12 is characterized by flat opposite faces which allow it to be disposed flat upon the horizontal ledge or shelf of a right-angular mounting bracket 24. The bracket 24 may be secured to a wall or the like (not shown) by a plurality of mounting screws 26. The simplicity of mounting and plumbing of the valve 10 is apparent in FIG. 1 and, as will be seen, results from the generally aligned, symmetrical arrangement of the axes of the various passages which intersect the auxiliary and main bores 14 and 16. The generally flat faces of the casing 12 also adapt it for direct attachment to a wall surface, if desired.

In this regard, the main bore 16 is intersected by longitudinally spaced feed and discharge passages 28 and 30 to which feed and discharge conduits 32 32 and 34, respectively, are threadedly connected. The conduits 32 and 34 extend into and out of the water treatment equipment, which in the present instance is a usual water softener (not shown). Of course, the water treatment equipment could just as well be a filter, demineralizer, or the like.

The supply and distribution conduits 20 and 22 are similarly coupled to longitudinally spaced inlet and outlet passages 36 and 38 which intersect the auxiliary bore 14.

The cylindrical auxiliary bore 14 is divided into a supply section 40 and a distribution section 42 by a center web or transverse wall 44 which forms an integral part of the casing 12. The casing also includes a pair of transfer passages 46 and 48 on opposite sides of the wall 44 and coupling the main bore with the supply and distribution sections 40 and 42, respectively.

It is particularly noted that the centerlines or axes of the passages 36 and 38, and the axes of the passages 28 and 30 all lie in the same plane, which plane also includes the centerlines or longitudinal axes of the auxiliary and main bores 14 and 16. This allows the valve 10 to be flat against the mounting bracket 24, or against any flat mounting surface, as desired. Moreover, the axes of the passages 36 and 38 are aligned with the axes of the passages 28 and 30, respectively. This arrangement, as well as the design of the valve member 18, allows the center-to-center distance between these respective axes to be increased as desired. Three inches is the accepted or standard distance since it allows room for a wrench to be disposed about the conduits for securement to the valve casing 12.

Mounting bosses 50 are integrally molded in the casing 12 and receive mounting fasteners or bolts 52 which secure the valve 10 to the bracket 24. If desired, the bolts 52 could be utilized to mount the valve 10 in a vertical position directly to suitable wall structure without the use of the bracket 24. The push rod, valve plunger or member 18 is preferably injection molded of an acetyl type of thermoplastic material. Since the valve 10 is generally symmetrical about its center, the valve member 18 can be inserted into the main bore 16 from either end and the operation of the valve 10 will be unchanged, as will be seen. The term "center" is intended to mean the location of an imaginary line 54 approximately midway between the axes of the inlet and outlet passages 36 and 38 and the passages 28 and 30, as seen in FIG. 3. In this regard, the dash-dot line 56 in FIG. 4 illustrates the location of the common plane of the bores 16 and 14 and the passages 28, 30, 46 and 48.

The valve member 18 comprises an elongated stem or shaft 58 having an integral end cap or knob 60 and an oppositely threaded end to which is threadedly mounted a second knob 62. Although not shown, the end of the knob 62 is suitably imprinted with the instruction "Push For Soft," while the opposite knob 60 is imprinted with the words "Push To By-Pass" or the like to apprise the user of the proper location of the member 18 for the function desired.

Four circular pistons or spools 64, 66, 68 and 70 are integrally carried by the valve shaft 58 between the knobs 60 and 62, and each spool includes a circumferential groove for a conventional O-ring. This provides a slidable, sealing engagement with reduced diameter portions or lands of the main bore 16 located between the various passages intersecting the main bore. Although not shown, the transition between the larger diameter portions to the reduced diameter lands is preferably gradual to reduce wear and abrading of the O-rings during reciprocation of the valve member 18.

The end spools 70 and 64 are equally spaced from their adjacent knobs 60 and 62. In addition, the distance between the pair of spools 64 and 66 is equal to the distance between the pair of spools 66 and 68, and each of these distances is twice the distance between the pair of spools 68 and 70.

In operation, the conduits 20 and 22 are connected to the valve casing 12 to carry water from the street main into the supply section 40 of the casing 12, and to carry treated water from the distribution section 42 to the distribution conduit 22. Similarly, the water softener conduits 32 and 34 are connected to the water softener (not shown) to carry water into and out of the softener. Next, the valve member 18 is moved axially into the water treatment position illustrated in FIG. 5. Water then passes through the inlet passage 36, into the supply section 40, through the transfer passage 46, into the main bore 16, out of the feed passage 28 and to the water softener. Softened water then passes from the softener discharge conduit 34, through the discharge passage 30, back into the main bore 16, through the transfer passage 48, into the distribution section 42, and out of the outlet passage 38 to the distribution conduit 22.

When it is necessary to service or repair the water softener, or when it is time to replace the water softening tank of a "-nonautomatic" softener, the softener is bypassed by moving the valve member 18 to the bypass position illustrated in FIG. 3. In this position, the spools of the valve member 18 are located on the lands of the main bore 16 such that the feed and discharge passages 28 and 30 are isolated from the transfer passages 46 and 48. Thus, water from the supply conduit 20 passes into the supply section 40, through the transfer passage 46, into the main bore 16, through the transfer passage 48, into the distribution section 42, and out to the distribution conduit 22 without ever entering the water softener.

Referring now to FIGS. 6 and 7, an embodiment of the present valve is illustrated which is identical in many respects to the first embodiment. Consequently, like numerals will be applied to like parts for simplicity. The major differences between the two embodiments lie in the provision of a strainer 72 and a push rod or shutoff valve member 74, the casing 12a being suitably cast or molded to provide receiving spaces for the strainer 72 and shutoff member 74.

More particularly, the auxiliary bore forming the supply section constitutes a shutoff bore 14a having an open outer end. The shutoff member 74 is reciprocable within the bore 14a and includes a stem or shaft 78 which projects outwardly of the bore 14a. The outer end of the shaft 78 integrally mounts an end knob 80, while the opposite extremity of the shutoff member 74 includes a pair of spaced-apart pistons or spools 82 having peripheral grooves within which are disposed sealing O-rings. In the "on" position in which the member 74 is illustrated, incoming water from the conduit 20 passes through the shutoff bore 14a, through the transfer passage 46a, and into the main bore 16. When the knob 80 is pressed inwardly, the spools 82 will be disposed on opposite sides of the inlet passage 36, preventing incoming water from passing to the transfer passage 46a.

A snap ring retainer 84 seated within a complemental groove in the outer extremity of the shutoff bore 14a prevents the member 74 from being pulled or expelled out of the bore without first removing the retainer.

With this arrangement, the shutoff member 74 can be utilized at any time to completely isolate the water softener from the incoming water. It also provides an additional shutoff in the event that the valve member 18 cannot itself be utilized for shutoff purposes because it requires service or the O-rings thereof need to be replaced.

The inward extremity of the shutoff bore 14a is intersected by a transverse core passage 86 which is threaded to receive the screwcap of the strainer 72. The lower extremity of the strainer 72 comprises a stainless steel mesh basket which fits within the transfer passage 46a, as illustrated, and filters out foreign particles such as scale, rust particles, small stones, foreign debris, or the like which might otherwise plug or clog components of the valve, the water softener, or plumbing downstream of the valve. The strainer is conveniently unscrewed from the core passage 86 for periodic cleaning, after first having shut off the water by moving the rod 78 to its inward position.

The provision of the strainer 72 and the shutoff member 74 is exemplary of the manner in which auxiliary elements can be added to the present valve 10, particularly by virtue of the provision of bores 14 and 16 of cylindrical configuration and of generally the same diameter. The sections 40 and 42 resulting from this arrangement are available for auxiliary purposes without any really major modifications of the overall design. By way of further example, the section 42 can also serve as a second output merely by providing an opening 88 to the exterior of the valve for reception of a second distribution conduit 90, the opening 88 and conduit 90 being shown in dotted outline in FIG. 6.

From the foregoing, it will be apparent that the valve 10 provides a compact design in which the axes of the various bores and passages are so located that the valve is characterized by flat opposite faces for ready mounting to various surfaces, and the plumbing of the valve is greatly simplified by the resulting alignment of the associated conduits. In addition, the provision of an auxiliary bore 14 of approximately the same diameter as the main bore 16 provides considerable valve versatility in that auxiliary components such as the shutoff member 74 and the strainer 72 may be comparatively easily incorporated in the valve assembly.

Various modifications and changes may be made with regard to the foregoing detailed description without departing from the spirit of the invention.

I claim:

1. A bypass valve for water treatment equipment, said valve comprising:
    a casing including an auxiliary bore intersected by longitudinally spaced inlet and outlet passages, a main bore parallel to said auxiliary bore and intersected by longitudinally spaced feed and discharge passages, said casing further including a pair of transfer passages coupling said auxiliary and main bores, and a transverse wall between said pair of transfer passages dividing said auxiliary bore into a pair of sections; and a valve member mounted for reciprocation in said main bore and having a bypass position in which said feed and discharge passages are isolated from said transfer passages whereby water is constrained to flow from said inlet passage through one of said sections, through the adjacent one of said transfer passages and into said main bore, through the other of said transfer passages, through the other of said sections, and through said outlet passage, said valve member having a water treatment position in which said feed and discharge passages are connected to said transfer passages whereby water is constrained to flow from said inlet passage through said one of said sections, through the adjacent one of said transfer passages and into said main bore, through said feed passage and back through said discharge passage after passing through said water treatment equipment, back into said main bore, through the other of said transfer passages, through the other of said sections, and through said outlet passage, the longitudinal axes of said main and auxiliary bores and all of said passages lying in the same plane whereby said valve is adapted to compactly fit against a flat mounting surface.

2. A bypass valve according to claim 1 wherein said main and auxiliary bores are cylindrical and of approximately the same diameter.

3. A bypass valve according to claim 1 wherein said main and auxiliary bores are cylindrical, and including a shutoff valve member mounted for reciprocation in said auxiliary bore to selectively close said inlet passage.

4. A bypass valve according to claim 1 wherein said casing includes a transverse core passage aligned with said transverse passage entering into said main bore, and including a strainer disposed through said core passage and located in said transverse passage for filtering water passing through said bypass valve.

5. A bypass valve according to claim 1 wherein said valve member includes first, second, third, and fourth O-ring spools and two end knobs, said first and fourth spools being end spools each equally spaced from the adjacent one of said end knobs, the spacing between said first and second spool being a predetermined distance, and the spacing between said second and third spools and the spacing between said third and fourth spools each being twice said predetermined distance.

6. A bypass valve according to claim 1 wherein the axes of said various passages are symmetrical about a centerline passing between said inlet and outlet passages and also passing between said feed and discharge passages.

7. A valve for controlling fluid flow, said valve comprising:

a casing including an auxiliary bore intersected by a pair of longitudinally spaced first passages, a main bore parallel to said auxiliary bore and intersected by a pair of longitudinally spaced second passages, said casing further including a pair of transfer passages coupling said auxiliary and main bores, and a transverse wall between said pair of transfer passages dividing said auxiliary bore into a pair of sections; and a valve member mounted for reciprocation in said main bore and having a first position in which said second passages are isolated from said transfer passages said valve member having a second position in which said second passages are connected to said transfer passages the longitudinal axes of said main and auxiliary bores and all of said passages lying in the same plane.

8. A valve according to claim 7 wherein said main and auxiliary bores are cylindrical, and including a shutoff valve member mounted for reciprocation in said auxiliary bore to selectively close said inlet passage, and wherein said shutoff valve member includes a pair of axially spaced apart O-ring spools for location on opposite sides of one of said first passages for isolation thereof from said transfer passages.

9. A valve according to claim 7 wherein said casing includes a transverse core passage aligned with said transverse passage entering into said main bore, and including a strainer disposed through said core passage and located in said transverse passage for filtering fluid passing through said valve, said casing further including an additional opening into said auxiliary bore whereby said valve is characterized by a plurality of outlets for the filtered fluid.

10. A valve according to claim 9 wherein said casing further includes a shut-off valve member mounted for reciprocation in said auxiliary bore to selectively close said inlet passage.

* * * * *